United States Patent

Wohlrab

[11] Patent Number: 5,858,421
[45] Date of Patent: Jan. 12, 1999

[54] MOLD CLOSING DEVICE FOR A PLASTICS MOLDING MACHINE, IN PARTICULAR AN INJECTION MOLDING MACHINE

[75] Inventor: Walter Wohlrab, Weissenburg, Germany

[73] Assignee: Krauss-Maffei AG, München, Germany

[21] Appl. No.: 875,428

[22] PCT Filed: Nov. 12, 1996

[86] PCT No.: PCT/EP96/04941

§ 371 Date: Jul. 25, 1997

§ 102(e) Date: Jul. 25, 1997

[87] PCT Pub. No.: WO97/21529

PCT Pub. Date: Jun. 19, 1997

[30] Foreign Application Priority Data

Dec. 9, 1995 [DE] Germany .................. 195 45 980.6

[51] Int. Cl.⁶ .................................................. B29C 45/64
[52] U.S. Cl. .................. 425/589; 425/451.9; 425/495
[58] Field of Search ................................. 425/589, 595, 425/450.1, 451.9

[56] References Cited

U.S. PATENT DOCUMENTS 3,787,165  1/1974  Fischer et al. ................ 425/450.1
5,354,196  10/1994  Ziv-Av ......................... 425/450.1
5,578,329  11/1996  Hehl ............................ 425/450.1
5,700,502  12/1997  Hehl ............................ 425/451.9

FOREIGN PATENT DOCUMENTS 1 582 478 A  9/1969  France .
94 21 299 U  8/1995  Germany .

*Primary Examiner*—James P. Mackey
*Attorney, Agent, or Firm*—Henry M. Feiereisen

[57] ABSTRACT

A mold closing device for an injection molding machine has four tension members (17, 19) which interconnect the fixed mold closing plate (3) and the support plate (5) of the closing drive (7) in a tension-resistant manner are not formed as straight rods but have a L-shaped configuration, with each tension member (17, 19) being connected at an upper connection point (21, 25) to one plate (5, 3) and at a lower connection point (23, 27) to another pate (3, 5). The upper edge (33) of the tension members (17, 19) is positioned at a lower level than the closing pressure axis (11) in order to ensure a free access to the space between the mold clamping plates. The tension members (17, 19) are of exactly same shape and dimension so as to extend by the same amount when being subject to the closing pressure in order to maintain parallel disposition of the fixed clamping plate (3) and the support plate (5).

7 Claims, 1 Drawing Sheet

MOLD CLOSING DEVICE FOR A PLASTICS MOLDING MACHINE, IN PARTICULAR AN INJECTION MOLDING MACHINE

BACKGROUND OF THE INVENTION

The invention relates to a mold closing device for a plastics molding machine of the type including a machine frame, two fixed plates supported by the machine frame and facing each other in parallel relationship at a distance therebetween, at least one moveable mold clamping plate moveably guided in the frame, at least one closing drive supported on one of the fixed plates and capable of applying a closing force to the moveable mold clamping plate wherein the force is directed parallel to a closing force axis in the direction of the other fixed plate, and four tension members having identical shapes and dimensions and interconnecting the two fixed plates in a tension-resistant manner and absorbing the reaction force exerted by the closing drive on the two fixed plates, wherein each fixed plate is connected to the tension members at two upper attack points and two lower attack points which are located above and below, respectively, of the horizontal plane extending through the closing force axis.

The invention is preferably applicable to an injection molding machine, wherein in this case only a moveable mold clamping plate is provided and wherein one of the fixed plates is formed as a stationary mold clamping plate. The other fixed plate is the support plate of the closing drive. The invention, however, can also be used with mold closing devices provided with two moveable mold clamping plates which can be moved against each other by two closing drives. Both fixed plates are in this case support plates for the two closing drives. This construction is found especially with blow molding machines.

The force exerted by the closing device for closing the form acts on the two fixed plates as a reaction force pressing the plates apart. In addition, the plastic injected into the closed form exerts a driving force pressing the form halves apart, which force also has to be absorbed by the fixed plates. Consequently, the two fixed plates have to be connected by adequately sized tension members for preventing the fixed plates from moving apart and thus the form from opening under the injection pressure.

The tension members of injection molding machines of conventional design are constructed of four straight rods or columns which interconnect the two fixed plates, i.e. normally the stationary mold clamping plate and the support plate supporting the closing cylinder, wherein the tension members are connected in the corner regions of these plates. In this way, a reliable mutual support of the fixed plates with uniform force distribution over the area of these plates is attained which can reliably prevent the form from opening under the injection pressure, even if the injection pressure is applied non-symmetrically with respect to the center axis of the form as a result of the shape of the mold. The use of straight rods or columns as tension members is disadvantageous because the two rods distal from the frame in particular impede free access to the space between the fixed plates. This in particular complicates the use of a handling device intended to be inserted between the open mold halves for removing the finished articles.

The term "fixed plate" used above is meant to indicate that the plates are essentially stationary during operation and do not move when the form tools open and close. Normally, however, at least one of these fixed plates, possibly also both, are supported on the machine frame for limited movement in such a way that they can under the influence of the closure force execute small longitudinal displacements in the longitudinal direction in order to compensate for changes in length of the tension members.

In order to eliminate an obstruction of the access to the space between the forms, so-called rod-less injection molding machines (i.e. injection molding machines without cross-beam) were proposed. Instead of the straight rods or columns on each side of the machine, these machines have a C-shaped tension member which interconnects the two fixed plates with each other and extends in the region between the fixed plates essentially below the upper edge of the machine frame, thereby providing access to the space between the fixed plates. Such a rod-less injection molding machine is, for example, known from EP 0 554 068. Utilization of the same principle with C-shaped tension members in a plastics molding machine, in particular for a blow molding machine, with two C-shaped clamping plates which are moveable with respect to each other, is known from U.S. Pat. No. 3,787,165. It is also known from DE 44 11 649 A1 to construct such C-shaped tension members out of several parts, for example, out of two L-shaped parts connected to each other. That does not alter the fact that the L-shaped parts taken together form a C-shaped member which is connected to the fixed plates only at two points.

It is also known to completely eliminate the use of separate tension members and to support the two fixed plates directly on the suitably constructed C-shaped machine frame as described, for example, in DE-U-92 12 480.1.

However, introduction of the closing reaction forces into a C-shaped tension member or a C-shaped machine frame has the consequence that the unavoidable deformation of the C-member is associated with a spreading apart of the C-leg, i.e. with a change in angle of the C-leg. In order to prevent a corresponding change in angle between the fixed plates, i.e. to a loss of parallelism between the fixed plates, all known designs have in common that the two fixed plates are connected at their respective center and tiltable about a horizontal axis with the C-shaped tension members or with the machine frame, respectively. This then allows the two fixed plates to remain parallel with respect to each other independent of the deformations of the C-shaped tension members or of the machine frame. Because the two fixed plates and consequently also the molding tools connected thereto can be tilted about the horizontal axis, the fixed plates and the molding tools can be tilted about this horizontal axis by swelling forces acting eccentrically with respect to the center axis of the molding tool, so that the gap between the molding tools opens on one side, which can result in an release of the plastic melt into the gap and to the formation of a ridge on the injection-molded part. With conventional designs, the advantage of unobstructed access to the space between fixed plates is attained at the expense of increased susceptibility of the device to one-sided pressure of the form tools.

SUMMARY OF THE INVENTION

It is the object of the invention to provide a device of the type described above so that the space between the fixed plates is unobstructed by straight guide rods and freely accessible, while at the same time the fixed plates are reliably retained in their mutually parallel orientation.

The solution of the object according to the invention is attained by interconnecting each tension member with one of the fixed plates at an upper attack point and with the other fixed plate at a lower attack point. The dependent claims relate to additional advantageous embodiments of the invention.

In contrast to known rod-less machines wherein each side of the machine is provided with only one tension member formed in the shape of a C, in this invention there are provided on each side of the machines two tension members of identical shape, in particular L-shape, as this is the case also in conventional machines with straight tension rods. As opposed to the machines with straight tension rods, in the device of the invention, each tension member is connected to one fixed plate above and to the other fixed plate below the horizontal plane extending through the closure force axis. Since all tension members have the same form, they also experience the same elongation when the closure force is applied to the fixed plates. Consequently, the spacing between the connection points of the fixed plates with the tension members changes by the same amount, i.e. the fixed plates remain exactly parallel with respect to each other. Since, on the other hand, each fixed plate is connected to the tension members at the upper and lower connection points, the fixed plate cannot tilt freely about a horizontal axis, but is held by the tension members in vertical orientation.

BRIEF DESCRIPTION OF THE DRAWING

An embodiment of the invention will be discussed hereinafter with reference to the drawings. It is shown in.

DETAILED DESCRIPTION OF PREFERRED EMBODIMENTS

Figure 1:
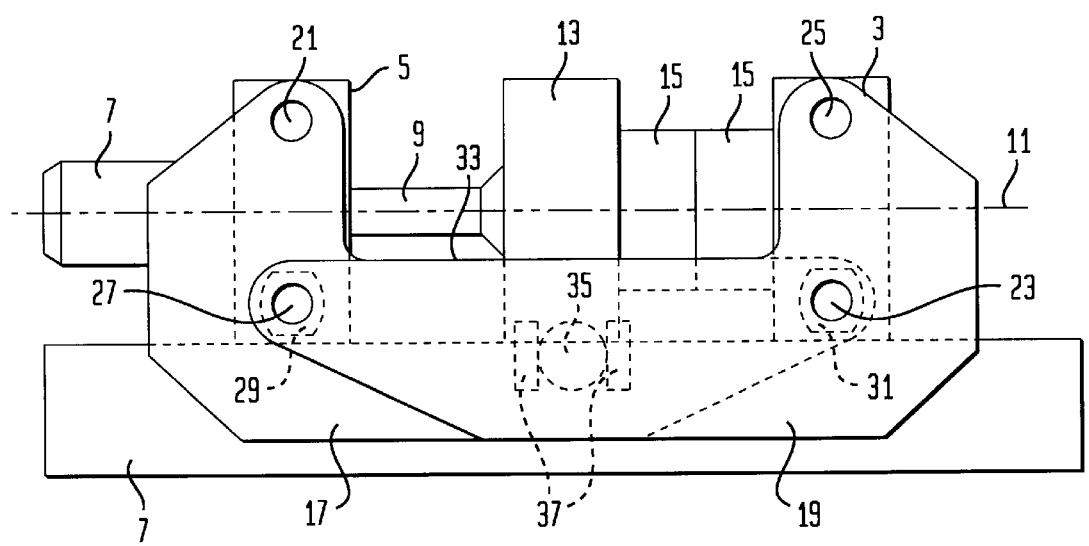
FIG. 1 a schematic side view of a mold closing device for an injection molding machine according to an embodiment of the invention.

The device according to FIG. 1 includes a machine frame 1 supporting two fixed plates 3, 5 which are mutually parallel and face each other with a distance therebetween. The one fixed plate 3 is constructed as a stationary mold clamping plate and is non-moveably secured to the machine frame. The other fixed plate 5 is a support plate for a hydraulic closing cylinder 7 which penetrates the fixed plate 5 and the piston 9 of which can exert a closure force on a moveable mold clamping plate 13 which is guided for longitudinal motion on the machine frame 1. On the mold clamping plates 3, 13 there are secured the injection molding form tools 15 which have a closure force applied thereto by the closing cylinder 7 acting along a closure force axis 11, which extends preferably through the geometric center of the fixed plates 3, 5 and of the moveable mold clamping plate 13.

The closure force of the closing cylinder 7 operates on the two fixed plates 3, 5 as a reaction force driving them apart. In order to prevent the fixed plates 3, 5 from moving away from each other, these are connected by four L-shaped tension members, with only the two tension members 17, 19 on the front side of the machine visible in FIG. 1. Accordingly, the two other L-shaped tension members (not shown in FIG. 1) are disposed on the back side of the machine. All tension members have exactly the same form and dimensions.

Each of the tension members is L-shaped with a shorter vertical leg and a longer horizontal leg. The tension member 17 is positioned closer to the fixed plate 3, 5 and can consequently be referred to as inner tension member, whereas the tension member 19 is located on the outside of the tension member 17 and can therefore be referred to as outer tension member. At the end of its vertical leg, the inner tension member 17 is connected with the fixed plate 5 above the closure force axis 11 by way of a connecting pin 21, and at the end of its horizontal leg is connected with the fixed plate 3 below the closure force axis 11 by way of a pin 23. Correspondingly, the vertical leg of the outer L-shaped tension member 19 is connected with the fixed plate 3 above the closure force axis 11 by way of a pin 25 and the end of its horizontal leg is connected with the fixed plate 5 below the closure force axis 11 by way of a pin 27. The connection points 21, 23, 25, 27 are preferably equidistantly spaced from the closure force axis 11, and are preferably located as close as possible to the upper or lower corners of the fixed plates 3, 5.

The inner tension member 17 is provided with a recess 29 adapted for penetration of the pin 27 from the outer tension member 19 to the fixed plate 5. This recess 29 represents a weakening of the inner tension member 19 and, consequently, influences its flexural and tensile strength. In order for the tension members 17, 19 to retain an exactly identical deformation stiffness, the tension member 19 is also provided with a recess 31 with the same shape and position as the recess 29; however, this recess 31 has no utility for the penetration of a pin.

On the rear side of the machine which is not visible in FIG. 1, there are provided two additional tension members arranged in identical fashion, i.e. there is provided a total of four tension members symmetrically disposed with respect to a vertical plane extending through the closure force axis 11. As a result of the L-shape of the tension members, the upper edge 33 of the tension members is positioned lower than the closure force axis 11, at least between the moveable mold clamping plate and the fixed mold clamping plate 3, preferably however along the entire distance between the fixed plate 3, 5, so that the tension members 17, 19 do not impede the free access to the space between the fixed plates 3, 5 and, in particular, the access of a handling device, between the opened form tools 15. Preferably, the upper edge 33 is located below the lower edge of the form cavities provided in the form tools 15.

The tension members 17, 19 are sized sufficiently large and rigid so that they experience the least possible deformation and length change as a result of the closure force exerted by the closing device 7. By providing all four tension members with exactly the same form and dimensions, the change in distance between the connecting pins 21, 23 and the connecting pins 25, 27 which occurs as a result of the deformation and length change of the tension members, can be made identical so that the fixed plates 3, 5 maintain their exact parallelism.

In the embodiment described above, one of the fixed plates, namely the stationary mold clamping plate 3, is secured to the machine frame 1. The other fixed plate 5 is moveably supported, for example, by a side bearing (not shown), in order to allow small displacements caused by the length change of the tension members 17, 19. The moveable mold clamping plate 13 is moveably supported on the machine frame 1, for example, by a roller bearing (not shown).

The inner tension member 17 and the outer tension member 19 disposed on each side of the machine are, in the depicted embodiment, not connected with each other. In a modified embodiment (not shown), they can be connected in an articulated fashion at the longitudinal center of their horizontal legs by way of a connecting pin.

In another modified embodiment, which is indicated in FIG. 1 as a broken line, the inner tension member 17 includes a pin 35 pointing towards the machine frame 1 which is guided between two vertical guides 37 of the machine frame in such a way that the pin 35 cannot be moved in the horizontal direction. In this embodiment, the vertically guided pin 35 represents the actual fixed point on the machine frame 1. In this case, the rigid attachment of the fixed form clamping plate 3 to the machine frame 1 is absent, i.e. in this case the fixed form clamping plate 3 as well as the support plate 5 must be supported on the machine frame 1 by a slide bearing in such a way that small horizontal displacements are permitted.

What is claimed is:

1. A mold closing device for a plastics molding machine, comprising a machine frame (1), two fixed plates (3, 5) supported by the machine frame (1) and facing each other in parallel relationship at a distance therebetween, at least one moveable mold clamping plate (13) moveably guided in the frame (1), at least one closing drive (7) supported on one of the fixed plates (5) and capable of applying a closing force to the moveable mold clamping plate (13) wherein the force is directed parallel to a closing force axis (11) in the direction of the other fixed plate (3), and four tension members (17, 19) having identical shapes and dimensions and rigidly interconnecting the two fixed plates (3, 5) and absorbing a reaction force exerted by the closing drive on the two fixed plates, wherein the fixed plates (3, 5) are connected to the tension members (17, 19) at two upper attack points (21, 25) and two lower attack points (23, 29) which are located above and below, respectively, of the horizontal plane extending through the closing force axis (11), characterized in that each tension member (17, 19) is interconnected with one of the fixed plates (3, 5) at an upper attack point (21, 25) and with the other fixed plate (5, 3) at a lower attack point (23, 29).

2. The device of claim 1 wherein the tension members (17, 19) are formed L-shaped with a substantially vertical leg connected to the upper attack point (21, 25), and a substantially horizontal leg connected to the lower attack point (23, 29), said tension members (17, 19) having an upper edge (33) at least in the region between a stationary mold clamping plate (3) and the moveable mold clamping plate (13) is positioned below a horizontal plane extending through the closing force axis (11).

3. The device of claim 1 wherein two of the tension members (17, 19) form a first pair of tension members arranged on one side of the machine frame and the other two of the tension members (17, 19) form a second pair of tension members, with one of the tension members of each pair being positioned closer to the fixed plates (3, 5) and the other one of the tension members of each pair being positioned on the side of the one tension member (17) facing away from the fixed plates (3, 5), with the one tension member (17) being provided with a recess (29) for the insertion of a pin (27) connecting the other tension member (19) with a fixed plate (5).

4. The device of claim 3 wherein the other tension member (19) is provided with a recess (31) which has the same size and location as the recess (29) of the one tension member (17).

5. The device of claim 3 wherein the two tension members (17, 19) of each pair of tension members are interconnected with each other through a joint disposed in the longitudinal center of their horizontal legs.

6. The device of claim 3 wherein the one tension member (17) of each pair of tension members is so affixed to the machine frame (1) as to be immobile in the direction of the closing force axis (11).

7. The device of claim 6 wherein the one tension member of each pair of tension members is formed with a pin (35) protruding from the one tension member (17) towards the machine frame (1) and guided for vertical movement between vertical guides (37) of the machine frame (1).

\* \* \* \* \*